US012658706B2

(12) United States Patent
Zhang

(10) Patent No.: US 12,658,706 B2
(45) Date of Patent: Jun. 16, 2026

(54) REDUNDANT POWER SUPPLY CIRCUIT WITH DUAL POWER SUPPLY, ELECTRONIC DEVICE, SYSTEM, AND PUMPING UNIT

(71) Applicant: Wei Zhang, Xi'an (CN)

(72) Inventor: Wei Zhang, Xi'an (CN)

( * ) Notice: Subject to any disclaimer, the term of this patent is extended or adjusted under 35 U.S.C. 154(b) by 234 days.

(21) Appl. No.: 18/508,271

(22) Filed: Nov. 14, 2023

(65) Prior Publication Data

US 2025/0079842 A1 Mar. 6, 2025

(30) Foreign Application Priority Data

Sep. 6, 2023 (CN) .......................... 202322420884.3

(51) Int. Cl.
*H02J 3/32* (2026.01)
*H02J 3/38* (2026.01)
*H02J 3/46* (2026.01)
*H02J 101/24* (2026.01)

(52) U.S. Cl.
CPC ............... *H02J 3/32* (2013.01); *H02J 3/381* (2013.01); *H02J 3/46* (2013.01); *H02J 2101/24* (2026.01)

(58) Field of Classification Search
CPC ...... H02J 3/32; H02J 3/381; H02J 3/46; H02J 2300/24; H02J 1/108; H02J 7/35
See application file for complete search history.

(56) References Cited

U.S. PATENT DOCUMENTS

| | | | | |
|---|---|---|---|---|
| 2005/0185352 A1* | 8/2005 | Nguyen | ................... | H02J 9/061 |
| | | | | 361/90 |
| 2011/0115295 A1* | 5/2011 | Moon | ........................ | H02J 3/32 |
| | | | | 307/65 |
| 2013/0272691 A1* | 10/2013 | Yamaguchi | ............... | G05F 3/08 |
| | | | | 396/301 |
| 2022/0200287 A1* | 6/2022 | Endo | .......................... | H02J 3/38 |
| 2022/0396167 A1* | 12/2022 | Sharifipour | ............. | B60L 53/51 |
| 2023/0163683 A1* | 5/2023 | Molina Llorente | ......................... | |
| | | | | H02M 3/1584 |
| | | | | 323/234 |
| 2024/0195191 A1* | 6/2024 | Antonsson | ............ | H02J 7/0048 |

* cited by examiner

*Primary Examiner* — Rexford N Barnie
*Assistant Examiner* — Rasem Mourad
(74) *Attorney, Agent, or Firm* — Yue (Robert) Xu; Apex Attorneys at Law, LLP

(57) ABSTRACT

A redundant power supply circuit with a dual power supply, an electronic device, a system, and a pumping unit. The circuit includes a photovoltaic hybrid unit for energy storage and power generation, a dry battery, a first boost circuit, a second boost circuit, a first diode D1 and a second diode D2. A first controller of the first boost circuit is configured to perform closed-loop control on an output voltage of the first boost circuit based on a first voltage setting value V1 when the photovoltaic hybrid unit for energy storage and power generation generates power. A second controller of the second boost circuit is configured to perform closed-loop control on an output voltage of the second boost circuit based on a second voltage setting value V2 when the dry battery generates power. V1>V2+V0, and each of the first and second diodes has a switched-on voltage drop V0.

13 Claims, 7 Drawing Sheets

REDUNDANT POWER SUPPLY CIRCUIT WITH DUAL POWER SUPPLY, ELECTRONIC DEVICE, SYSTEM, AND PUMPING UNIT

CROSS REFERENCE OF RELATED APPLICATION

The present application claims priority to Chinese Patent Application No. 202322420884.3, titled "REDUNDANT POWER SUPPLY CIRCUIT WITH DUAL POWER SUPPLY, ELECTRONIC DEVICE, SYSTEM, AND PUMPING UNIT", filed on Sep. 6, 2023 with China National Intellectual Property Administration, which is incorporated herein by reference in its entirety.

FIELD

The present disclosure relates to the technical field of power electronics, and in particular to a redundant power supply circuit with a dual power supply, an electronic device, a system, and a pumping unit.

BACKGROUND

A pumping unit is a mechanical device for oil extraction, which belongs to devices for field operation. The pumping unit is generally not allowed to stop midway after starting without special circumstances. Multiple sensors (such as a load sensor and a wireless displacement sensor) are arranged on the pumping unit to provide necessary signals for normal operation of the pumping unit.

A conventional pumping unit is mostly provided with a wired sensor. In some harsh environments, the wired sensor has low reliability, which affects the normal operation of the pumping unit. Taking a wired load sensor used on the conventional pumping unit as an example, it has the following problems: a) in a low-temperature winter environment, a cable (such as a power supply line or a signal line) of the wired load sensor becomes hard, and in addition, the wired load sensor is installed on a suspension device of a movable component of the pumping unit, causing the cable to be repeatedly bent and easily broken; b) in a gale weather, the cable is easily blown onto a mechanical component such as a polish rod of the pumping unit and hooked here, making it extremely easy to break when the pumping unit is running. After the cable is disconnected, a load signal is lost, causing great problems for the normal operation of the pumping unit.

As an alternative, a wireless sensor is becoming increasingly popular on the pumping unit. Currently, the wireless sensor on the pumping unit is powered by a dry battery and wirelessly transmits a sensor signal. The dry battery is a disposable battery to be replaced regularly, resulting in an increase of the power supply cost of the wireless sensor.

The above contents illustrate a defect of an electronic device powered by the dry battery by taking the wireless sensor on the pumping unit as an example. The above defect also exists in other electronic devices powered by the dry battery.

SUMMARY

In view of this, a redundant power supply circuit with a dual power supply, an electronic device, a system, and a pumping unit are provided according to the present disclosure, to reduce power supply cost of the electronic device.

A redundant power supply circuit with a dual power supply includes a photovoltaic hybrid unit for energy storage and power generation 10, a dry battery 20, a first boost circuit 30, a second boost circuit 40, a first diode D1, and a second diode D2. The photovoltaic hybrid unit for energy storage and power generation 10 includes a photovoltaic panel, a battery, and an energy management unit. The energy management unit is configured to supply power generated by the photovoltaic panel to a load, store remaining power into the battery, and control the battery to release power when the power generated by the photovoltaic panel is insufficient for the load to operate, to supply power to the load together with the photovoltaic panel. An input end of the first boost circuit 30 is connected to the photovoltaic hybrid unit for energy storage and power generation 10, and an output end of the first boost circuit 30 is connected to an anode of the first diode D1. A cathode of the first diode D1 is connected to a cathode of the second diode D2 at a connection point, and the connection point serves as an output end of the redundant power supply circuit with the dual power supply. The first boost circuit 30 includes a first controller, the first controller is configured to perform closed-loop control on an output voltage of the first boost circuit 30 based on a first voltage setting value V1 when the photovoltaic hybrid unit for energy storage and power generation 10 generates power. The second boost circuit 40 includes a second controller, the second controller is configured to perform closed-loop control on an output voltage of the second boost circuit 40 based on a second voltage setting value V2 when the dry battery 20 generates power. A value of a first switched-on voltage drop of the first diode D1 is V0, a value of a second switched-on voltage drop of the second diode D2 is V0, and the first voltage setting value V1 is greater than a sum of the second voltage setting value V2 and the value of the first/second switched-on voltage drop V0.

In an embodiment, the energy management unit is a voltage stabilizing circuit with a triode. The voltage stabilizing circuit with a triode includes an input filter capacitor C24, a first resistor R22, a second resistor R23, a third resistor R25, a triode Q5, a three-terminal voltage regulator U7, and an output filter capacitor C27. A positive electrode of the input filter capacitor C24 is connected to a collector of the triode Q5 and one terminal of the first resistor R22. A base of the triode Q5 is connected to another terminal of the first resistor R22 and an output terminal 2 of the three-terminal voltage regulator. An emitter of the triode Q5 is connected to one terminal of the second resistor R23 and a positive electrode of the output filter capacitor C27. Another terminal of the second resistor R23 is connected to one terminal of the third resistor R25 and a common terminal 1 of the three-terminal voltage regulator U7. Another terminal of the third resistor R25 is connected to an input terminal 3 of the three-terminal voltage regulator U7, a negative electrode of the input filter capacitor C24, a negative electrode of the output filter capacitor C27, and the ground GND. The input filter capacitor C24 is connected in parallel to the photovoltaic panel, and the input end of the first boost circuit 30, the output filter capacitor C27, and the battery are connected in parallel to each other.

In an embodiment, the redundant power supply circuit with the dual power supply further includes a precise power supply unit. The redundant power supply circuit with the dual power supply includes multiple outputs, one of the multiple outputs is connected to the precise power supply unit, and the precise power supply unit is configured to convert a voltage into a voltage with higher precision for output.

An electronic device includes any one of the redundant power supply circuit with the dual power supply described above.

In an embodiment, the electronic device is a wireless sensor for a pumping unit. The wireless sensor for a pumping unit includes a signal acquisition circuit, a signal processing circuit, a microprocessor, a wireless communication module, and the redundant power supply circuit with the dual power supply. The signal acquisition circuit is configured to acquire a sensor signal under control of the microprocessor and output the sensor signal to the signal processing circuit. The signal processing circuit is configured to process an input signal under the control of the microprocessor, and output the processed input signal to the microprocessor. The microprocessor is configured to transmit the processed input signal through the wireless communication module. The redundant power supply circuit with the dual power supply is configured to provide power supply that meets requirements for the wireless sensor for the pumping unit.

In an embodiment, the wireless sensor for a pumping unit includes a wireless load sensor for a pumping unit.

In an embodiment, the wireless sensor for a pumping unit further includes a first voltage measurement unit and a second voltage measurement unit. The first voltage measurement unit is configured to measure an output voltage of one power supply in the redundant power supply circuit with the dual power supply and output the output voltage to the microprocessor. The second voltage measurement unit is configured to measure an output voltage of the other power supply in the redundant power supply circuit with the dual power supply and output the output voltage to the microprocessor.

A transmission and reception system for a pumping unit includes any one of the electronic device described above, and a receiving device arranged on a control cabinet that is wirelessly connected to the electronic device. The receiving device includes a control unit, a wireless communication module on the control cabinet, a power supply module, and a signal output module. The wireless communication module on the control cabinet is configured to receive a wireless signal under control of the control unit and output the wireless signal to the control unit. The signal output module is configured to process an output signal of the control unit under the control of the control unit, and output a processed output signal to the control cabinet. The power supply module is configured to provide power supply that meets requirements for the receiving device.

In an embodiment, in a case that the electronic device includes a wireless load sensor for a pumping unit, the signal output module includes multiple load output modules, and different load output modules are configured to output different types of load signals.

A pumping unit includes any one of the transmission and reception system for a pumping unit described above.

From the above technical solutions, it can be seen that according to the present disclosure, the photovoltaic hybrid unit for energy storage and power generation serves as a main power supply and the dry battery serves as a backup power supply by controlling the output voltages of the two boost circuits and utilizing the unidirectional conductivity of the diode, so that the main power supply supplies power in a case that the main power supply generates power, and the main power supply is automatically switched to the backup power supply to supply power in a case that the power generated by the main power supply is insufficient. Compared with a single power supply solution in the conventional technology that only the dry battery is used, according to the present disclosure, a redundant power supply solution with the dual power supply is adopted, renewable energy such as photovoltaic energy is fully utilized, greatly reducing the use of the disposable battery such as the dry battery, thereby reducing the power supply cost of the electronic device and improving the reliability of power supply.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

Figure 1A:
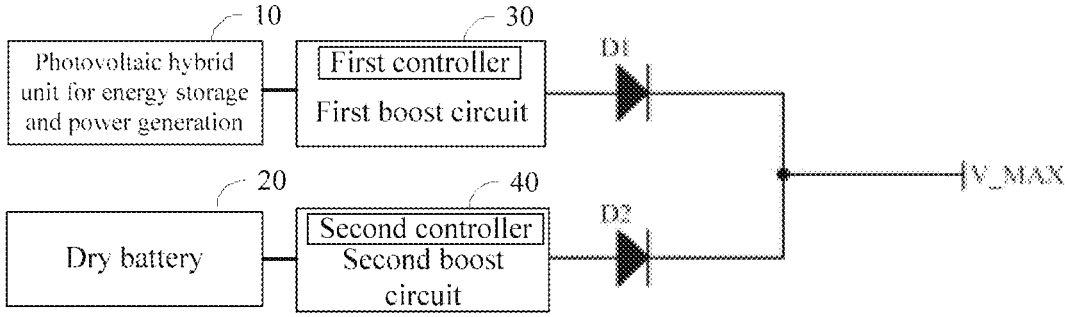
FIG. 1A is a schematic circuit diagram of a redundant power supply circuit with a dual power supply according to an embodiment of the present disclosure.

Reference numerals are as follows:

901 fixed housing

20 dry battery

10 photovoltaic hybrid unit for energy storage and power generation

9012 sealing member

9011 installation opening

300 wireless communication antenna 902 first sealing member
903 second sealing member
904 third sealing member
905 adhesive
9061 first housing
9062 second housing;
9063 load pressure column
9071 first cylindrical body
9072 second cylindrical body.

DETAILED DESCRIPTION

Technical solutions of embodiments of the present disclosure are described clearly and completely hereinafter in conjunction with the drawings in the embodiments of the present disclosure. Apparently, the described embodiments are only a part of the embodiments of the present disclosure, rather than all embodiments. All other embodiments obtained by those skilled in the art based on the embodiments in the present disclosure without any creative effort fall within the protection scope of the present disclosure.

As shown in FIG. 1A, a redundant power supply circuit with a dual power supply is provided according to an embodiment of the present disclosure. The redundant power supply circuit includes a photovoltaic hybrid unit for energy storage and power generation 10, a dry battery 20, a first boost circuit 30, a second boost circuit 40, a first diode D1, and a second diode D2.

Figure 2:
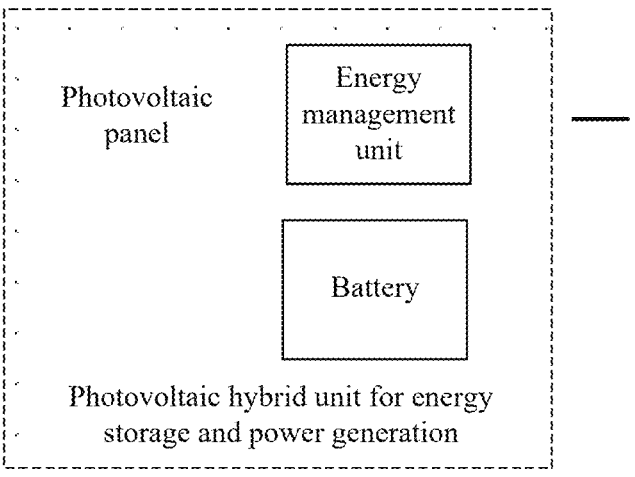
FIG. 2 is a schematic circuit diagram of a photovoltaic hybrid unit for energy storage and power generation according to an embodiment of the present disclosure.

The photovoltaic hybrid unit for energy storage and power generation 10 includes a photovoltaic panel, a battery, and an energy management unit (as shown in FIG. 2). The energy management unit is configured to supply power generated by the photovoltaic panel to a load, store remaining power into the battery, and control the battery to release power in a case that the power generated by the photovoltaic panel is insufficient for the load to operate to supply power to the load together with the photovoltaic panel.

The first boost circuit 30 is connected to the photovoltaic hybrid unit for energy storage and power generation 10 through an input end of the first boost circuit 30, and the first boost circuit 30 is connected to an anode of the first diode D1 through an output end of the first boost circuit 30.

The second boost circuit 40 is connected to the dry battery 20 through an input end of the second boost circuit 40, and the second boost circuit 40 is connected to an anode of the second diode D2 through an output end of the second boost circuit 40.

A cathode of the first diode D1 is connected to a cathode of the second diode D2, and the cathodes serve as an output end of the redundant power supply circuit with the dual power supply.

The first boost circuit 30 includes a first controller. The first controller is configured to perform closed-loop control on an output voltage of the first boost circuit 30 based on a first voltage setting value V1 in a case that the photovoltaic hybrid unit for energy storage and power generation 10 generates power. The second boost circuit 40 includes a second controller. The second controller is configured to perform closed-loop control on an output voltage of the second boost circuit 40 based on a second voltage setting value V2 in a case that the dry battery 20 generates power. V1>V2+V0, the first diode D1 and the second diode D2 have a same switched-on voltage drop, and a value of the switched-on voltage drop is V0.

Hereinafter, operation principles of the redundant power supply circuit with the dual power supply according to the embodiments of the present disclosure are described in detail.

The first controller of the first boost circuit 30 performs closed-loop control on the output voltage of the first boost circuit 30 in a case that the photovoltaic hybrid unit for energy storage and power generation 10 generates power, so that the output voltage of the first boost circuit 30 reaches the first voltage setting value V1 (where principles of the closed-loop control of the controller on the boost circuit belong to well-known technology, which are not repeated herein). The second controller of the second boost circuit 40 performs closed-loop control on the output voltage of the second boost circuit 40 in a case that the dry battery 20 generates power, so that the output voltage of the second boost circuit 40 reaches the second voltage setting value V2. According to the embodiment of the present disclosure, V1 and V2 meet a condition of V1>V2+V0 (for example, V1=5.0V, V2=4.5V, and the switched-on voltage drop V0 is equal to 0.3V in a case that the first diode D1 and the second diode D2 each are implemented by a Schottky diode). In a case that both the photovoltaic hybrid unit for energy storage and power generation 10 and the dry battery 20 generate power, a difference between the output voltage of the first boost circuit 30 and the switched-on voltage drop of the first diode D1 is greater than the output voltage of the second boost circuit 40, and thus the first diode D1 is switched on and the second diode D2 is switched off. The redundant power supply circuit with the dual power supply first supplies power to the load through the photovoltaic hybrid unit for energy storage and power generation 10. An output voltage V_MAX of the redundant power supply circuit with the dual power supply is equal to V1−V0.

In a case that the power generated by the photovoltaic hybrid unit for energy storage and power generation 10 is insufficient, and the dry battery 20 generates power, the output voltage of the first boost circuit 30 is zero, and the output voltage of the second boost circuit 40 is V2. In such case, the first diode D1 is switched off and the second diode D2 is switched on. The redundant power supply circuit with the dual power supply is automatically switched to use the dry battery 20 to supply power to the load, and the output voltage V_MAX of the redundant power supply circuit with the dual power supply is equal to V2−V0.

After the photovoltaic hybrid unit for energy storage and power generation 10 recovers to generate power, the output voltage of the first boost circuit 30 is increased to V1. In such case, the first diode D1 is switched on and the second diode D2 is switched off. The redundant power supply circuit with the dual power supply is switched to use the photovoltaic hybrid unit for energy storage and power generation 10 to supply power to the load, and the output voltage V_MAX of the redundant power supply circuit with the dual power supply is equal to V1−V0.

It can be seen that according to the embodiment of the present disclosure, the photovoltaic hybrid unit for energy storage and power generation 10 serves as a main power supply and the dry battery 20 serves as a backup power supply by controlling the output voltages of the two boost circuits and utilizing the unidirectional conductivity of the diode, so that the main power supply supplies power in a case that the main power supply generates power, and the main power supply is automatically switched to the backup power supply to supply power in a case that the power generated by the main power supply is insufficient. Compared with a single power supply solution in the conventional technology that only the dry battery 20 is used, according to the embodiment of the present disclosure, a redundant power supply solution with the dual power supply is adopted, renewable energy such as photovoltaic energy is fully utilized, greatly reducing the use of the disposable battery such as the dry battery 20, thereby reducing the power supply cost of the electronic device and improving the reliability of power supply.

According to the embodiment of the present disclosure, the photovoltaic hybrid unit for energy storage and power generation 10 is an existing modular unit on the market. The photovoltaic hybrid unit combines photovoltaic power generation technology with energy storage technology. In a case that a power of the photovoltaic power generation exceeds a power required by the load, that is, the photovoltaic panel generates a remaining power, the remaining power generated by the photovoltaic panel is stored in the battery. In a case that the power generated by the photovoltaic panel is insufficient, the battery is controlled to release power to supply power to the load together with the photovoltaic panel, so as to fully utilize the power generated by the photovoltaic panel.

The power generation of the photovoltaic hybrid unit for energy storage and power generation 10 is affected by a lighting condition and a temperature (where the power generation of the photovoltaic panel is affected by the lighting condition, and an efficiency of the power generation of the photovoltaic panel decreases as the lighting condition becomes worse, and a storage capacity of the battery decreases under a low temperature condition). Therefore, the dry battery 20 in the embodiment of the present disclosure has a large storage capacity and a wide temperature range, so that the dry battery 20 may normally operate under the low temperature condition and has strong environmental adaptability. For example, the dry battery 20 has a capacity of 19 Ah and a temperature range of –55° C. to 85° C., and may independently support a wireless load sensor of the pumping unit to operate for 6 to 18 months under the low temperature condition, avoiding frequent replacement of the dry battery 20.

Figure 3:
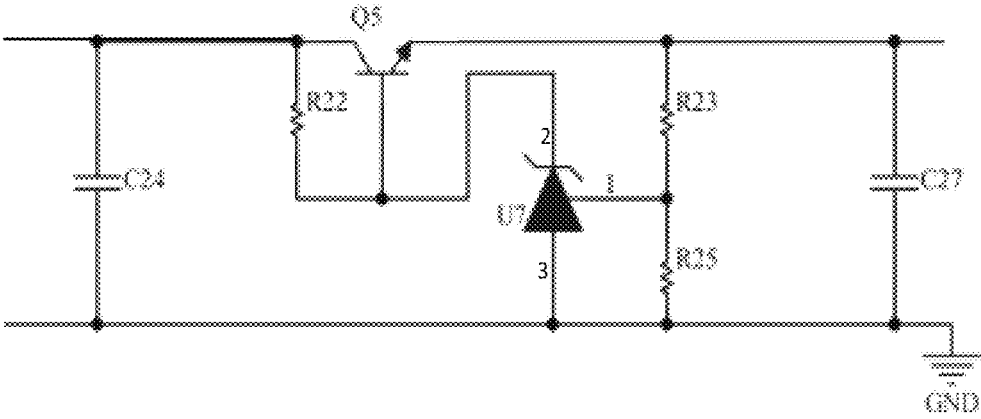
FIG. 3 is a schematic circuit diagram of a voltage stabilizing circuit with a triode according to an embodiment of the present disclosure.

In an embodiment of the present disclosure, the energy management unit is the voltage stabilizing circuit with a triode. As shown in FIG. 3, the voltage stabilizing circuit with a triode includes an input filter capacitor C24, a first resistor R22, a second resistor R23, a third resistor R25, a triode Q5, a three-terminal voltage regulator U7, and an output filter capacitor C27.

A positive electrode of the input filter capacitor C24 is connected to a collector of the triode Q5 and one terminal of the first resistor R22. A base of the triode Q5 is connected to another terminal of the first resistor R22 and an output terminal 2 of the three-terminal voltage regulator U7. An emitter of the triode Q5 is connected to one terminal of the second resistor R23 and a positive electrode of the output filter capacitor C27. Another terminal of the second resistor R23 is connected to one terminal of the third resistor R25 and a common terminal 1 of the three-terminal voltage regulator U7. Another terminal of the third resistor R25 is connected to an input terminal 3 of the three-terminal voltage regulator U7, a negative electrode of the input filter capacitor C24, a negative electrode of the output filter capacitor C27, and the ground GND. The input filter capacitor C24 is connected in parallel to the photovoltaic panel. The input end of the first boost circuit 30, the output filter capacitor C27, and the battery are connected in parallel to each other.

Operation principles of the voltage stabilizing circuit with a triode shown in FIG. 3 are as follows. The three-terminal voltage regulator U7, the second resistor R23 and the third resistor R25 form the voltage stabilizing circuit. The voltage stabilizing circuit may stabilize an output voltage of the three-terminal voltage regulator U7 at a voltage of (1+R23/R25)×V3, where V3 represents a reference voltage of the three-terminal voltage regulator U7. A current of the photovoltaic panel flows through the first resistor R22 to the output terminal 2 of the three-terminal voltage regulator U7. A voltage at the output terminal 2 of the three-terminal voltage regulator U7 is gradually increased and stabilized at the voltage of (1+R23/R25)×V3. In such case, the triode Q5 is switched on, and the positive electrode of the output filter capacitor C27 obtains the voltage of (1+R23/R25)×V3 to charge the battery.

Figure 1B:
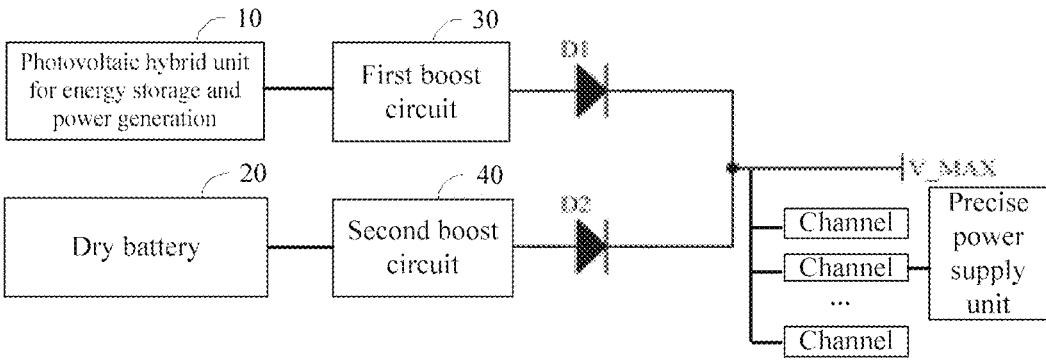
FIG. 1B is another schematic circuit diagram of a redundant power supply circuit with a dual power supply according to an embodiment of the present disclosure.

Based on any one of the embodiments of the present disclosure, in an embodiment, as shown in FIG. 1B, the redundant power supply circuit with the dual power supply further includes a precise power supply unit. The redundant power supply circuit with the dual power supply includes multiple outputs. One of the multiple outputs is connected to the precise power supply unit, and the precise power supply unit is configured to convert a voltage into a voltage with higher precision for output to meet different accuracy requirements of a power supply voltage of multiple components inside the electronic device.

In addition, an electronic device is further provided according to an embodiment of the present disclosure, and the electronic device includes the redundant power supply circuit with the dual power supply according to any one of the above embodiments of the present disclosure.

Figure 4:
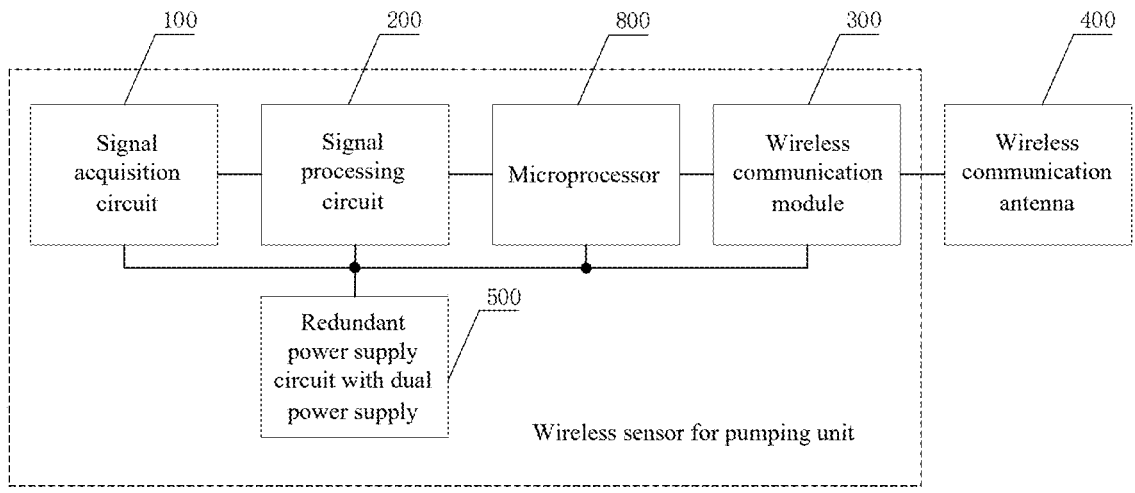
FIG. 4 is a schematic structural diagram of a wireless sensor for a pumping unit according to an embodiment of the present disclosure.

The electronic device, for example, is a wireless sensor for a pumping unit. As shown in FIG. 4, the electronic device includes a signal acquisition circuit 100, a signal processing circuit 200, a microprocessor 800, a wireless communication module 300, and the redundant power supply circuit with the dual power supply 500 according to any one of the above embodiments of the present disclosure.

The signal acquisition circuit 100 is configured to acquire a sensor signal under control of the microprocessor 800 and output the sensor signal to the signal processing circuit 200. The signal processing circuit 200 is configured to process an input signal, such as amplify the input signal and perform analog-to-digital conversion on the input signal, under control of the microprocessor 800, and output the processed input signal to the microprocessor 800. The microprocessor 800 is configured to transmit the processed input signal through the wireless communication module 300. Normally, the wireless communication module 300 is connected to a wireless communication antenna 400 for increasing a wireless communication distance of the wireless communication module 300. The redundant power supply circuit with the dual power supply 500 is configured to provide power supply that meets requirements for the wireless sensor for the pumping unit.

The wireless sensor for the pumping unit wirelessly transmits the sensor signal without on-site wiring, fundamentally avoiding the problem of breakdown of the cables of the wired sensor and improving the reliability of transmission of the sensor signal. Moreover, the redundant power supply circuit with the dual power supply also ensures the reliability of power supply.

The wireless sensor for the pumping unit may be, such as the wireless load sensor or a wireless displacement sensor used on the pumping unit. That is, the signal acquisition circuit 100 is configured to acquire a load signal or an acceleration signal and output the load signal or the acceleration signal to the signal processing circuit 200. The wireless load sensor for the pumping unit is configured to measure the load signal of the pumping unit. The load signal is a crucial signal in oilfield production. The operation of the pumping unit may be optimized through the load signal, achieving energy-saving, environment-friendly, efficient, and low-carbon oil recovery, and achieving overload protection and underload protection of the pumping unit.

Figure 5:
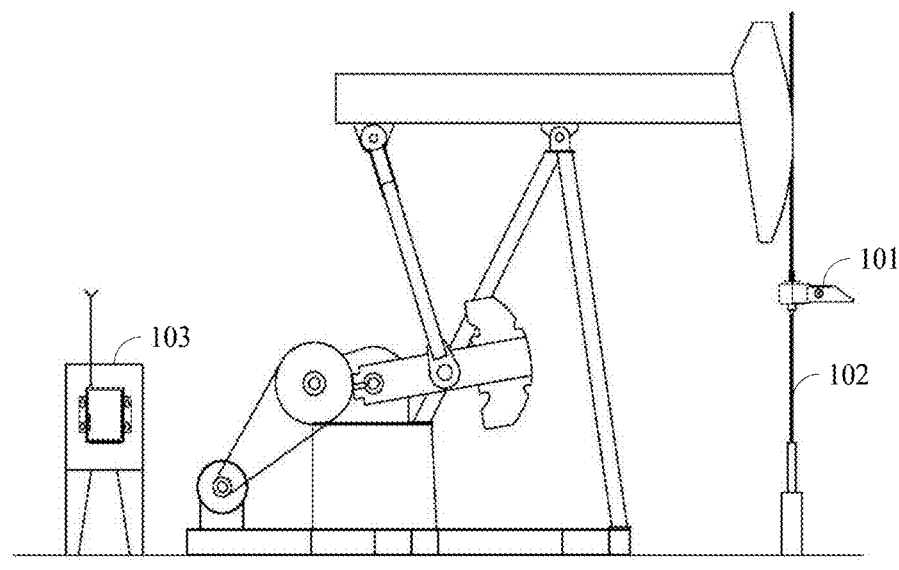
FIG. 5 is a schematic installation diagram of a wireless load sensor for a pumping unit according to an embodiment of the present disclosure.

A wireless load sensor 101 for the pumping unit is arranged on a wireline hanger 102 of the pumping unit for measuring the load signal. The load signal is transmitted wirelessly to a wireless receiving device arranged on a control cabinet 103, as shown in FIG. 5.

Figure 6:
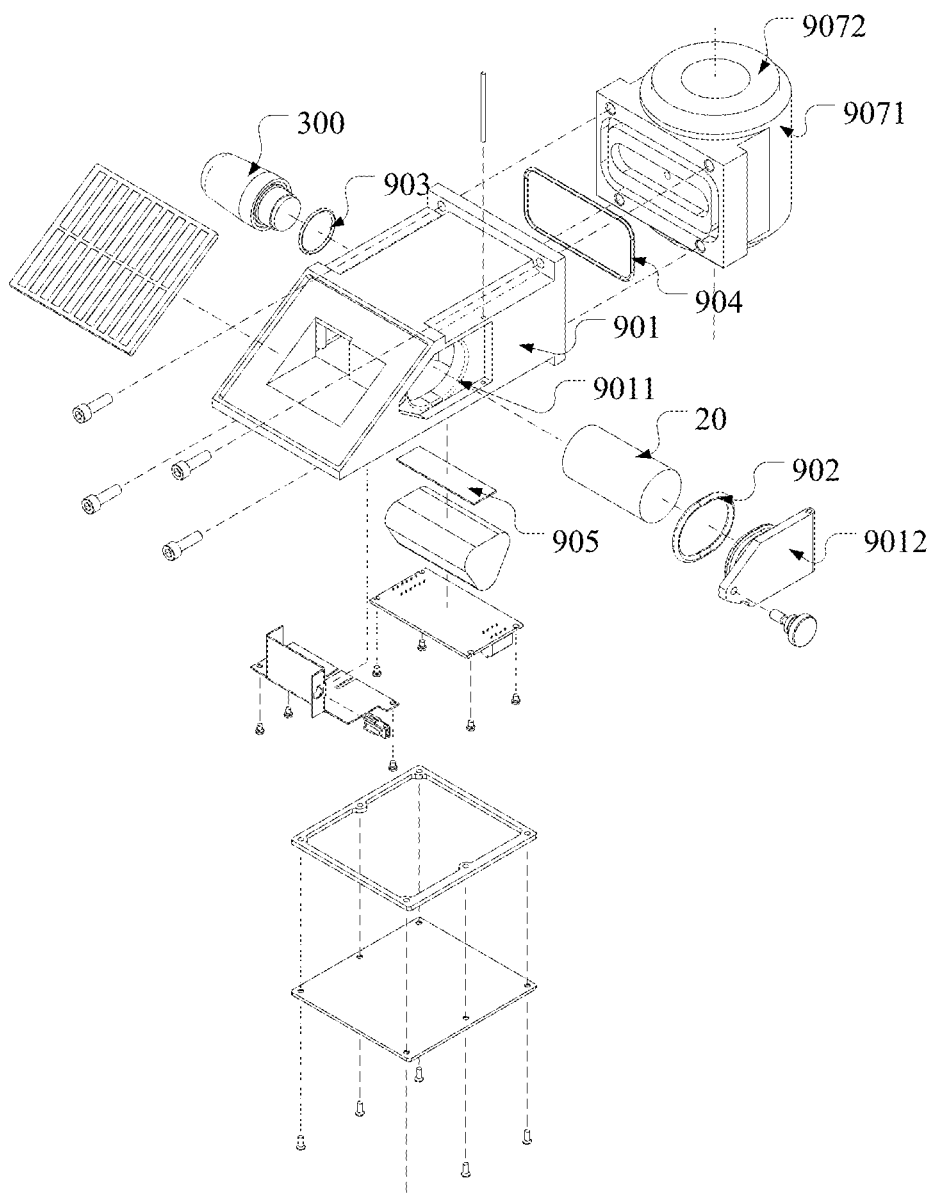
FIG. 6 is a schematic structural diagram of a redundant power supply circuit with a dual power supply according to an embodiment of the present disclosure.

As shown in FIG. 6, the redundant power supply circuit with the dual power supply according to the present disclosure may be applied to a power supply structure with the dual power supply. The power supply structure with the dual power supply includes a fixed housing 901. The photovoltaic panel is arranged on an outer surface of the fixed housing 901, so that the photovoltaic hybrid unit for energy storage and power generation 10 aborts and utilizes sunlight throughout the daytime. The battery is arranged inside the fixed housing 901 and may be fixed to an inner wall of the fixed housing 901 by using an adhesive 905. The adhesive 905 includes but is not limited to glue and double-sided adhesive.

As the backup power supply, the dry battery 20 is arranged inside the fixed housing 901. In order to facilitate the replacement of the dry battery 20, an installation opening 9011 is defined on the fixed housing 901, and a sealing member 9012 is arranged for sealing up the installation opening 9011. The sealing member 9012 matches the installation opening 9011 through a connection member. Specifically, the connection member includes a rotation shaft. One end of the rotation shaft is arranged at the sealing member 9012, and the other end of the rotation shaft of the rotation shaft is arranged at the installation opening 9011 of the fixed housing 901. The sealing member 9012 may open or close the installation opening 9011 by rotating the rotation shaft, so as to install and replace the dry battery 20. Furthermore, a first scaling member 902 is arranged between the installation opening 9011 and the scaling member 9012, so that the fixed housing 901 is firmly sealed by the sealing member 9012.

The wireless communication antenna 300 is arranged on the fixed housing 901, and a second sealing member 903 is arranged between the fixed housing 901 and the wireless communication antenna 300. The second sealing member 903 ensures that the wireless communication antenna 300 is firmly connected to the fixed housing 901, and the fixed housing 901 is sealed to protect electrical components arranged inside the fixed housing 901. Furthermore, in a case that the power supply structure with the dual power supply is connected to the wireless sensor for the pumping unit, a third sealing member 904 is arranged between the power supply structure with the dual power supply and the wireless sensor for the pumping unit, so that the power supply structure with the dual power supply is firmly connected to the wireless sensor.

Figure 7:
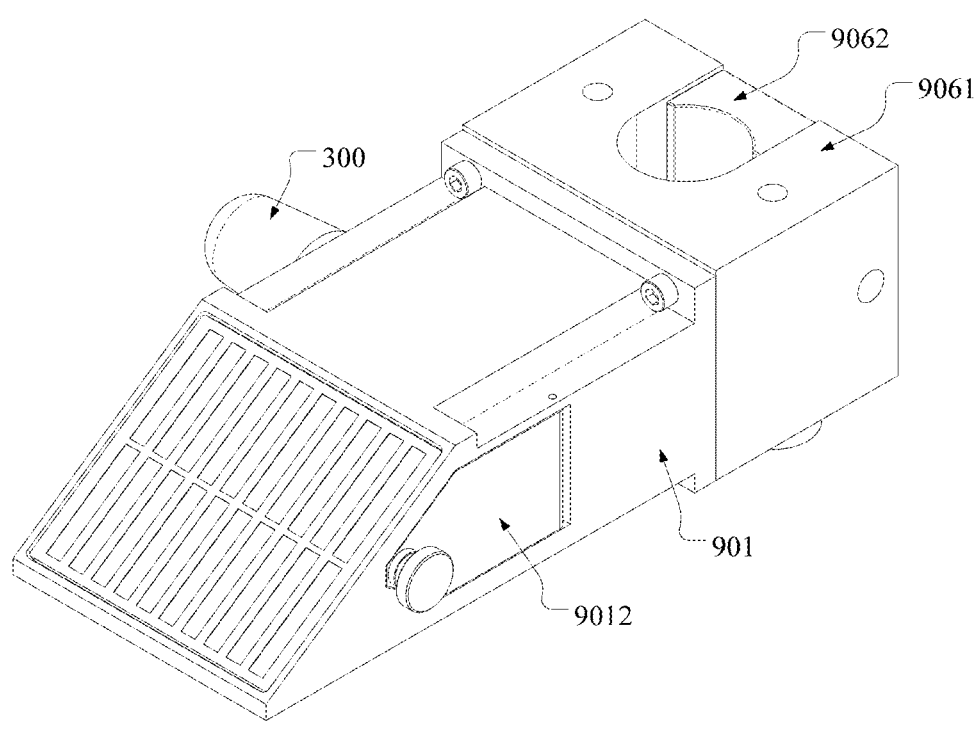
FIG. 7 is a schematic installation diagram of a first load sensor according to an embodiment of the present disclosure.
Figure 8:
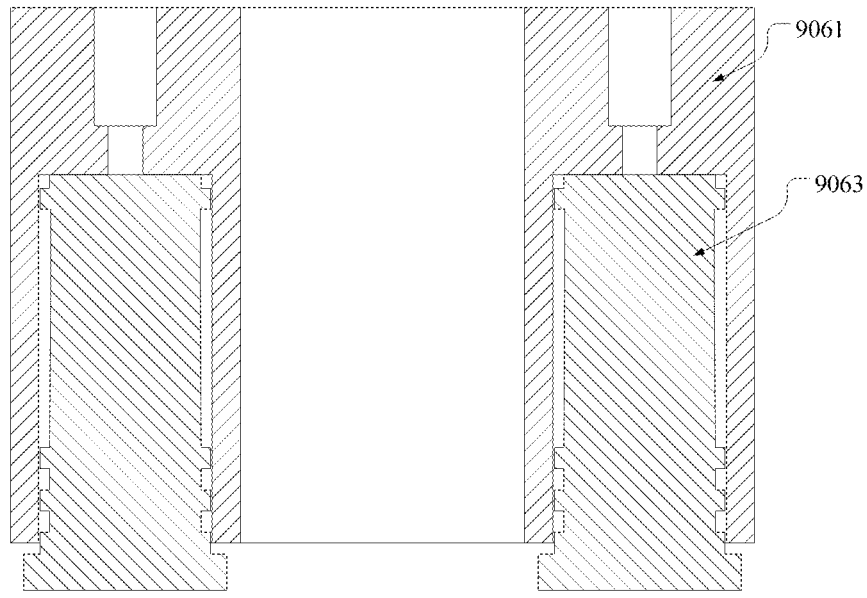
FIG. 8 is a sectional view of a first load sensor according to an embodiment of the present disclosure.
Figure 9:
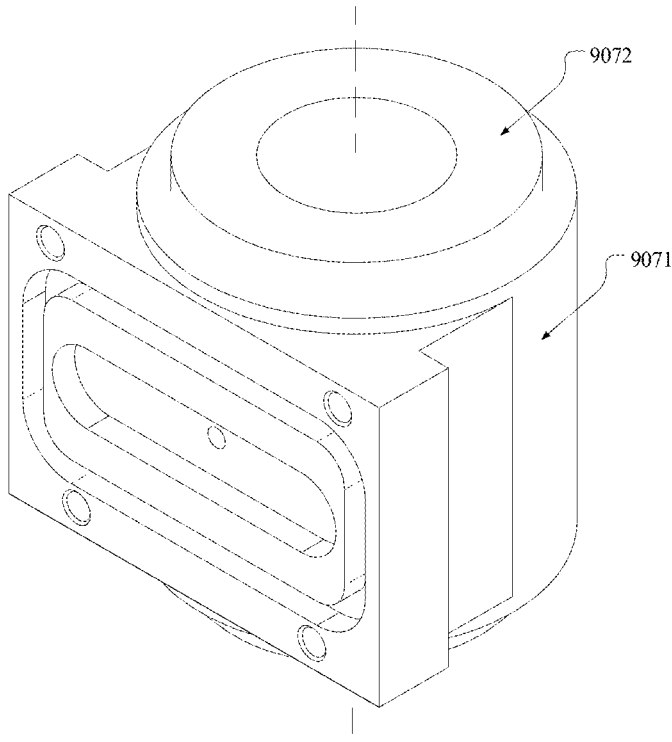
FIG. 9 is a schematic structural diagram of a second load sensor according to an embodiment of the present disclosure.
Figure 10:
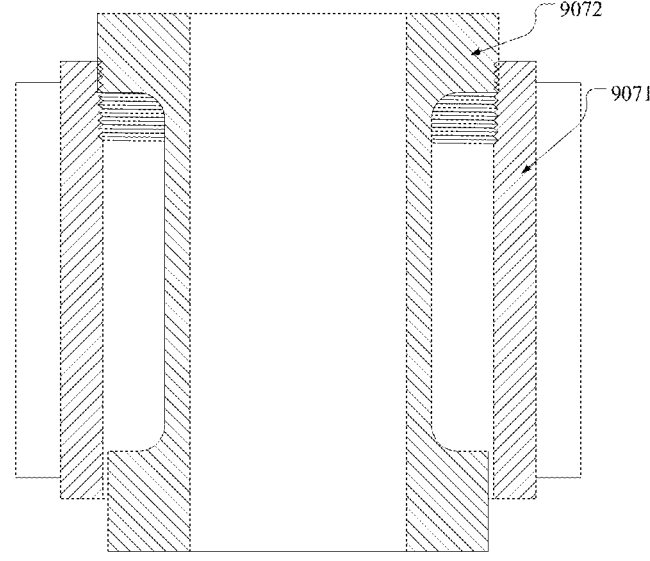
FIG. 10 is a sectional view of a second load sensor according to an embodiment of the present disclosure.

It should be noted that the wireless load sensor 101 in the present disclosure includes but is not limited to a first load sensor shown in FIG. 7 and a second load sensor shown in FIG. 9.

The load sensor is configured to detect a magnitude of an applied load. The first load sensor includes a first housing 9061 and a second housing 9062. The first housing 9061 is provided with a U-shaped groove with a width greater than a diameter of the wireline hanger. The first housing 9061 is movably connected to the second housing 9062, to form a fixed hole on an inner side of the load sensor for the wireline hanger of the pumping unit to pass through. For installing the first load sensor, the first housing 9061 may be first arranged on the wireline hanger through a breach on the first housing 9061, and then the second housing 9062 may be arranged at the breach on the first housing 9061 to fix the first load sensor.

Two ends of the U-shaped groove on the first housing 9061 are provided with a load pressure column 9063, and a strain gauge is arranged on the load pressure column 9063. In a case that an axial load is applied to the first load sensor, the load pressure column 9063 is subjected to force, so that the strain gauge arranged on the load pressure column 9063 generates an electrical signal corresponding to the load, thereby detecting the magnitude of the load.

The second load sensor includes a first cylindrical body 9071 and a second cylindrical body 9072 that are arranged coaxially. The first cylindrical body 9071 is fixedly connected to the second cylindrical body 9072, and the first cylindrical body 9071 is arranged outside the second cylindrical body 9072. The second cylindrical body 9072 is higher than the first cylindrical body 9071 on both a first side and a second side, that is, in a case that an axial load is applied to the second load sensor, the load is applied to the second cylindrical body 9072 on both the first side and the second side. A strain gauge is arranged on a side of the second cylindrical body 9072 close to the first cylindrical body 9071. In a case that the second cylindrical body 9072 is subjected to force, the strain gauge arranged on the second cylindrical body 9072 may generate an electrical signal corresponding to the load, thereby detecting the magnitude of the load.

Figure 11:
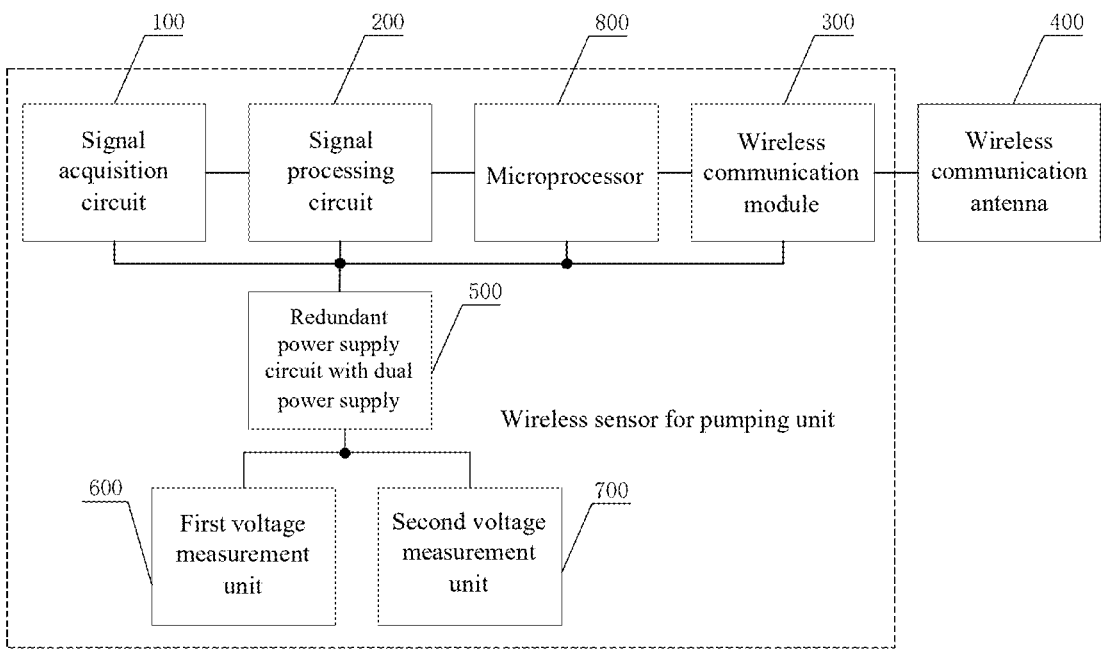
FIG. 11 is a schematic structural diagram of a wireless sensor for a pumping unit according to another embodiment of the present disclosure.

In an embodiment, as shown in FIG. 11, the wireless sensor for a pumping unit according to the any one of the above embodiments of the present disclosure further includes a first voltage measurement unit 600 and a second voltage measurement unit 700. The first voltage measurement unit 600 is configured to measure an output voltage of the photovoltaic hybrid unit for energy storage and power generation 10 and output the output voltage to the microprocessor 800. The second voltage measurement unit 700 is configured to measure an output voltage of the dry battery 20, and output the output voltage to the microprocessor 800. A sample voltage of the main power supply and a sample voltage of the backup power supply are fed back to the control cabinet 103 through the wireless communication module 300 and the wireless communication antenna 400 for the convenience of monitoring.

In addition, a transmission and reception system for a pumping unit is further provided according to an embodiment of the present disclosure. The transmission and reception system includes the wireless sensor for a pumping unit according to the any one of the above embodiments of the present disclosure, and a receiving device arranged on a control cabinet 103 that is wirelessly connected to the wireless sensor for a pumping unit.

Figure 12:
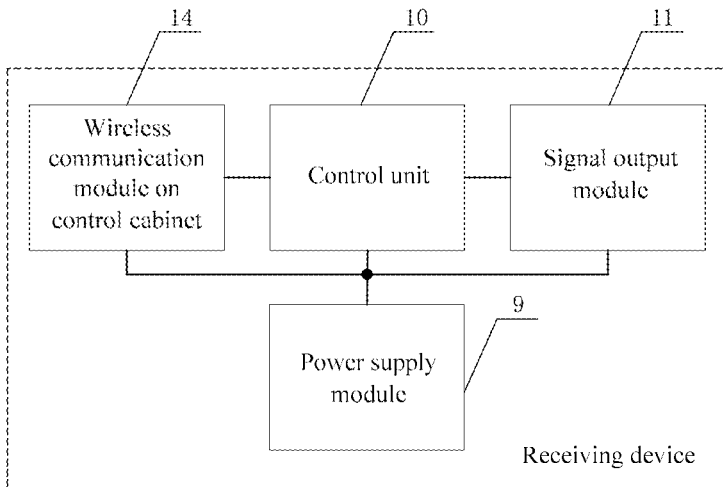
FIG. 12 is a schematic structural diagram of a transmission and reception system for a pumping unit according to another embodiment of the present disclosure.

As shown in FIG. 12, the receiving device includes: a control unit 10, a wireless communication module 14 on the control cabinet, a power supply module 9, and a signal output module 11. The wireless communication module 14 on the control cabinet is configured to receive a wireless signal under control of the control unit 10 and output the wireless signal to the control unit 10. The signal output module 11 is configured to process an output signal of the control unit 10 under the control of the control unit 10, such as analog-to-digital conversion, and output a processed output signal to the control cabinet 103. The power supply module 9 is configured to provide power supply that meets requirements for the receiving device.

In an embodiment, in a case that the wireless sensor for a pumping unit includes the wireless load sensor for a pumping unit, the signal output module 11 includes multiple load output modules, and different load output modules are configured to output different types of load signals. There may be different types of load signals, and a user is connected to an acquisition module of a type of load signal required by the control cabinet 103 by plugging and unplugging.

In addition, a pumping unit is further provided according to an embodiment of the present disclosure. The pumping unit includes the transmission and reception system for a pumping unit according to the any one of the above embodiments of the present disclosure.

The above embodiments are described in a progressive manner. Each of the embodiments is mainly focused on describing its differences from other embodiments, and references may be made among these embodiments with respect to the same or similar parts.

With the above descriptions of the disclosed embodiments, those skilled in the art can implement or practice the present disclosure. Various modifications to the embodiments are apparent to those skilled in the art, and the general principle herein can be implemented in other embodiments without departing from the spirit or scope of the present disclosure. Therefore, the present disclosure is not limited to the embodiments described herein, but should be in accordance with the broadest scope consistent with the principle and novel features disclosed herein.

The invention claimed is:

1. A redundant power supply circuit with a dual power supply, comprising: a photovoltaic hybrid unit for energy storage and power generation, a dry battery, a first boost circuit, a second boost circuit, a first diode, and a second diode; wherein the photovoltaic hybrid unit for energy storage and power generation comprises a photovoltaic panel, a battery, and an energy management unit, the energy management unit is configured to supply power generated by the photovoltaic panel to a load, store remaining power into the battery, and control the battery to release power when the power generated by the photovoltaic panel is insufficient for the load to operate, to supply power to the load together with the photovoltaic panel;

an input end of the first boost circuit is connected to the photovoltaic hybrid unit for energy storage and power generation, and an output end of the first boost circuit is connected to an anode of the first diode;

an input end of the second boost circuit is connected to the dry battery, and an output end of the second boost circuit is connected to an anode of the second diode;

a cathode of the first diode is connected to a cathode of the second diode at a connection point, and the connection point serves as an output end of the redundant power supply circuit with the dual power supply;

the first boost circuit comprises a first controller, the first controller is configured to perform closed-loop control on an output voltage of the first boost circuit based on a first voltage setting value V1 when the photovoltaic hybrid unit for energy storage and power generation generates power;

the second boost circuit comprises a second controller, the second controller is configured to perform closed-loop control on an output voltage of the second boost circuit based on a second voltage setting value V2 when the dry battery generates power; and a value of a first switched-on voltage drop of the first diode is V0, a value of a second switched-on voltage drop of the second diode is V0, and the first voltage setting value V1 is greater than a sum of the second voltage setting value V2 and the value of the first/second switched-on voltage drop V0, wherein the energy management unit is a triode voltage stabilizing circuit, and the triode voltage stabilizing circuit comprises an input filter capacitor, a first resistor, a second resistor, a third resistor, a triode, a three-terminal voltage regulator, and an output filter capacitor;

a positive electrode of the input filter capacitor is connected to a collector of the triode and one terminal of the first resistor;

a base of the triode is connected to another terminal of the first resistor and an output terminal of the three-terminal voltage regulator;

an emitter of the triode is connected to one terminal of the second resistor and a positive electrode of the output filter capacitor;

another terminal of the second resistor is connected to one terminal of the third resistor and a common terminal of the three-terminal voltage regulator;

another terminal of the third resistor is connected to an input terminal of the three-terminal voltage regulator, a negative electrode of the input filter capacitor, a negative electrode of the output filter capacitor, and a ground GND; and the input filter capacitor is connected in parallel to the photovoltaic panel, and the input end of the first boost circuit, the output filter capacitor, and the battery are connected in parallel to each other.

2. The circuit according to claim 1, further comprising:

a precise power supply unit;

wherein an output of the redundant power supply circuit with the dual power supply is divided into a plurality of channels, one of the plurality of channels is connected to the precise power supply unit, and the precise power supply unit is configured to convert a voltage into a voltage with higher precision for output.

3. An electronic device, comprising a redundant power supply circuit with a dual power supply;

wherein the redundant power supply circuit with the dual power supply comprises a photovoltaic hybrid unit for energy storage and power generation, a dry battery, a first boost circuit, a second boost circuit, a first diode, and a second diode;

wherein the photovoltaic hybrid unit for energy storage and power generation comprises a photovoltaic panel, a battery, and an energy management unit, the energy management unit is configured to supply power generated by the photovoltaic panel to a load, store remaining power into the battery, and control the battery to release power when the power generated by the photovoltaic panel is insufficient for the load to operate, to supply power to the load together with the photovoltaic panel;

wherein an input end of the first boost circuit is connected to the photovoltaic hybrid unit for energy storage and power generation, and an output end of the first boost circuit is connected to an anode of the first diode;

wherein an input end of the second boost circuit is connected to the dry battery, and an output end of the second boost circuit is connected to an anode of the second diode;

wherein a cathode of the first diode is connected to a cathode of the second diode at a connection point, and the connection point serves as an output end of the redundant power supply circuit with the dual power supply;

wherein the first boost circuit comprises a first controller, the first controller is configured to perform closed-loop control on an output voltage of the first boost circuit based on a first voltage setting value V1 when the photovoltaic hybrid unit for energy storage and power generation generates power;

wherein the second boost circuit comprises a second controller, the second controller is configured to perform closed-loop control on an output voltage of the second boost circuit based on a second voltage setting value V2 when the dry battery generates power; and wherein a value of a first switched-on voltage drop of the first diode is V0, a value of a second switched-on voltage drop of the second diode is V0, and the first voltage setting value V1 is greater than a sum of the second voltage setting value V2 and the value of the first/second switched-on voltage drop V0, wherein the energy management unit is a triode voltage stabilizing circuit, and the triode voltage stabilizing circuit comprises an input filter capacitor, a first resistor, a second resistor, a third resistor, a triode, a three-terminal voltage regulator, and an output filter capacitor;

a positive electrode of the input filter capacitor is connected to a collector of the triode and one terminal of the first resistor;

a base of the triode is connected to another terminal of the first resistor and an output terminal of the three-terminal voltage regulator;

an emitter of the triode is connected to one terminal of the second resistor and a positive electrode of the output filter capacitor;

another terminal of the second resistor is connected to one terminal of the third resistor and a common terminal of the three-terminal voltage regulator;

another terminal of the third resistor is connected to an input terminal of the three-terminal voltage regulator, a negative electrode of the input filter capacitor, a negative electrode of the output filter capacitor, and a ground GND; and the input filter capacitor is connected in parallel to the photovoltaic panel, and the input end of the first boost circuit, the output filter capacitor, and the battery are connected in parallel to each other.

4. The electronic device according to claim 3, the redundant power supply circuit with the dual power supply further comprises:

a precise power supply unit;

wherein an output of the redundant power supply circuit with the dual power supply is divided into a plurality of channels, one of the plurality of channels is connected to the precise power supply unit, and the precise power supply unit is configured to convert a voltage into a voltage with higher precision for output.

5. The electronic device according to claim 3, wherein the electronic device is a wireless sensor for a pumping unit;

the wireless sensor for the pumping unit comprises: a signal acquisition circuit, a signal processing circuit, a microprocessor, a wireless communication module, and the redundant power supply circuit with the dual power supply;

the signal acquisition circuit is configured to acquire a sensor signal under control of the microprocessor, and output the sensor signal to the signal processing circuit;

the signal processing circuit is configured to process an input signal under control of the microprocessor, and output the processed input signal to the microprocessor;

the microprocessor is configured to transmit the processed input signal through the wireless communication module; and the redundant power supply circuit with the dual power supply is configured to provide power supply that meets requirements for the wireless sensor for the pumping unit.

6. The electronic device according to claim 5, wherein the wireless sensor for the pumping unit further comprises a wireless load sensor for the pumping unit.

7. The electronic device according to claim 5, wherein the wireless sensor for the pumping unit further comprises a first voltage measurement unit and a second voltage measurement unit;

wherein the first voltage measurement unit is configured to measure an output voltage of one power supply in the redundant power supply circuit with the dual power supply and output said output voltage to the microprocessor, and wherein the second voltage measurement unit is configured to measure an output voltage of the other power supply in the redundant power supply circuit with the dual power supply and output said output voltage to the microprocessor.

8. A transmission and reception system for a pumping unit, comprising:

an electronic device, the electronic device being a wireless sensor for the pumping unit; and a receiving device arranged on a control cabinet that is wirelessly connected to the electronic device;

wherein the electronic device comprises a redundant power supply circuit with a dual power supply, and the redundant power supply circuit with the dual power supply comprises a photovoltaic hybrid unit for energy storage and power generation, a dry battery, a first boost circuit, a second boost circuit, a first diode, and a second diode;

wherein the photovoltaic hybrid unit for energy storage and power generation comprises a photovoltaic panel, a battery, and an energy management unit, the energy management unit is configured to supply power generated by the photovoltaic panel to a load, store remaining power into the battery, and control the battery to release power when the power generated by the photovoltaic panel is insufficient for the load to operate, to supply power to the load together with the photovoltaic panel;

wherein an input end of the first boost circuit is connected to the photovoltaic hybrid unit for energy storage and power generation, and an output end of the first boost circuit is connected to an anode of the first diode;

wherein an input end of the second boost circuit is connected to the dry battery, and an output end of the second boost circuit is connected to an anode of the second diode;

wherein a cathode of the first diode is connected to a cathode of the second diode at a connection point, and the connection point serves as an output end of the redundant power supply circuit with the dual power supply;

wherein the first boost circuit comprises a first controller, the first controller is configured to perform closed-loop control on an output voltage of the first boost circuit based on a first voltage setting value $V1$ when the photovoltaic hybrid unit for energy storage and power generation generates power;

wherein the second boost circuit comprises a second controller, the second controller is configured to perform closed-loop control on an output voltage of the second boost circuit based on a second voltage setting value $V2$ when the dry battery generates power;

wherein a value of a first switched-on voltage drop of the first diode is $V0$, a value of a second switched-on voltage drop of the second diode is $V0$, and the first voltage setting value $V1$ is greater than a sum of the second voltage setting value $V2$ and the value of the first/second switched-on voltage drop $V0$; wherein the receiving device comprises a control unit, a wireless communication module on the control cabinet, a power supply module, and a signal output module;

wherein the wireless communication module on the control cabinet is configured to receive a wireless signal under control of the control unit, and output the wireless signal to the control unit;

wherein the signal output module is configured to process an output signal of the control unit under control of the control unit, and output a processed output signal to the control cabinet; and wherein the power supply module is configured to provide power supply that meets requirements for the receiving device.

9. The transmission and reception system for the pumping unit according to claim 8, wherein the wireless sensor for the pumping unit comprises: a signal acquisition circuit, a signal processing circuit, a microprocessor, a wireless communication module, and the redundant power supply circuit with the dual power supply;

the signal acquisition circuit is configured to acquire a sensor signal under control of the microprocessor, and output the sensor signal to the signal processing circuit;

the signal processing circuit is configured to process an input signal under control of the microprocessor, and output the processed input signal to the microprocessor;

the microprocessor is configured to transmit the processed input signal through the wireless communication module; and the redundant power supply circuit with the dual power supply is configured to provide power supply that meets requirements for the wireless sensor for the pumping unit.

10. The transmission and reception system for the pumping unit according to claim 8, wherein the wireless sensor for the pumping unit further comprises a wireless load sensor for the pumping unit.

11. The transmission and reception system for the pumping unit according to claim 8, wherein the wireless sensor for the pumping unit further comprises a first voltage measurement unit and a second voltage measurement unit;

wherein the first voltage measurement unit is configured to measure an output voltage of one power supply in the redundant power supply circuit with the dual power supply and output said output voltage to the microprocessor; and wherein the second voltage measurement unit is configured to measure an output voltage of the other power supply in the redundant power supply circuit with the dual power supply and output said output voltage to the microprocessor.

12. The transmission and reception system for the pumping unit according to claim 10, wherein the signal output module comprises a plurality of load output modules, and different load output modules are configured to output different types of load signals.

13. The transmission and reception system for the pumping unit according to claim 11, wherein the signal output module comprises a plurality of load output modules, and different load output modules are configured to output different types of load signals.

* * * * *